United States Patent
Lu (10) Patent No.: US 12,140,244 B2
(45) Date of Patent: Nov. 12, 2024

(54) BALL VALVE

(71) Applicant: DELTA ELECTRONICS, INC., Taoyuan (TW)

(72) Inventor: Chao-Wen Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/993,858

(22) Filed: Nov. 23, 2022

(65) Prior Publication Data
US 2023/0341062 A1  Oct. 26, 2023

(30) Foreign Application Priority Data
Apr. 25, 2022   (CN) .......................... 202220958529.4

(51) Int. Cl.
*F16K 27/06*    (2006.01)
*F16K 5/06*     (2006.01)

(52) U.S. Cl.
CPC .......... *F16K 27/067* (2013.01); *F16K 5/0605* (2013.01); *F16K 5/0647* (2013.01)

(58) Field of Classification Search
CPC ...... F16K 5/06; F16K 5/0605; F16K 11/0873; F16K 11/0876; F16K 27/067
See application file for complete search history.

(56) References Cited

U.S. PATENT DOCUMENTS

| | | | | |
|---|---|---|---|---|
| 5,188,335 A * | 2/1993 | Pettinaroli | .............. | F16K 35/06 |
| | | | | 137/550 |
| 5,406,979 A * | 4/1995 | McHugh | ................ | A62C 35/68 |
| | | | | 137/557 |
| 5,560,392 A * | 10/1996 | Spang | ..................... | F16K 37/00 |
| | | | | 251/315.11 |
| 8,047,228 B2 * | 11/2011 | Depierri | .................. | B01J 8/006 |
| | | | | 137/550 |
| 2022/0042621 A1* | 2/2022 | Kleinpeter | ............ | F16K 37/005 |

FOREIGN PATENT DOCUMENTS

| | | | | |
|---|---|---|---|---|
| CN | 106870757 A | * | 6/2017 | ............ B01D 35/04 |
| EP | 0459376 A1 | * | 12/1991 | .......... F16K 5/0605 |
| EP | 1108867 A2 | * | 6/2001 | .............. F01P 7/167 |
| KR | 20090035916 A | * | 4/2009 | |
| KR | 101436826 B1 | * | 9/2014 | |
| WO | WO-2005010415 A1 | * | 2/2005 | .......... F16K 11/0873 |

* cited by examiner

*Primary Examiner* — Hailey K. Do
(74) *Attorney, Agent, or Firm* — Chun-Ming Shih; HDLS IPR SERVICES (57) ABSTRACT

This disclosure is directed to a ball valve having an outer valve body, a valve core, a rotational assembly, and a functional assembly. The valve core is accommodated in the outer valve body, and the valve core has a flow channel defined therein. The rotational assembly is connected to the valve core for turning the valve core. A portion of the functional assembly is disposed in the flow channel.

13 Claims, 9 Drawing Sheets

BALL VALVE

BACKGROUND OF THE DISCLOSURE

Technical Field

This disclosure is directed to a ball valve, and in particular to an easily maintainable ball valve.

Description of Related Art

A related-art water cooling system has a lot of pipelines for conveying working fluid, and a lot of pipeline devices with various functions, such as a filter, a check valve, a flowmeter, a thermometer, a pressure meter, and a water quality monitor, are generally connected to the pipelines. In order to maintain the pipeline devices, bypass lines are arranged corresponding to the respective pipeline device, and vales are respectively arranged on the main pipeline and the bypass lines. During a maintenance of the pipeline, the vales at the bypass lines should be turned on to allow a working fluid to flow through the bypass lines, and then the valves in front of and at back of a specific pipeline device should be turned off in order to detach this pipeline device. Therefore, a lot of valves and joints should be arranged on the pipeline, and the pipeline is bulky and easy to leak. If sufficient space for the bypass lines is unavailable, the pipeline should be turned off to drain the coolant therein before detaching the piping device.

In view of the above drawbacks, the inventor proposes this disclosure based on his expert knowledge and elaborate researches in order to solve the problems of related art.

SUMMARY OF THE DISCLOSURE

This disclosure is directed to an easily maintainable ball valve.

This disclosure is directed to a ball valve having an outer valve body, a valve core, a rotational assembly, and a functional assembly. The outer valve body has an inlet and an outlet. The valve core is accommodated in the outer valve body, and the valve core has a flow channel defined therein. The flow channel communicates with the inlet and the outlet when the valve core is located at a first position. The flow channel is disconnected with the inlet and the outlet when the valve core is located at a second position. The rotational assembly is connected to the valve core for turning the valve core. The functional assembly is intercrossed with the flow channel when the valve core is located either at the first location or at the second location According to this disclosure, the ball valve further has a filter connected with the valve core.

According to the ball valve of this disclosure, the functional assembly has a sensor or a signal transmitter According to the ball valve of this disclosure, the outer valve body further has a first maintenance opening. The flow channel communicates with the first maintenance opening, the inlet, and the outlet when the valve core is located at the first position. The flow channel communicates with the first maintenance opening and is disconnected with the inlet and the outlet when the valve core is located at the second location.

According to this disclosure, the ball valve further has a rotating shaft, and the rotational assembly is connected with the valve core via the rotating shaft.

This disclosure is directed to a ball valve having an outer valve body, a valve core, a rotational assembly, and a sensor. The valve core is accommodated in the outer valve body. The rotational assembly is capable of switching the valve core between a first position and a second position. The sensor has a sensing unit, and the sensing unit is disposed in the flow channel.

According to the ball valve of this disclosure, the outer valve body has an inlet and an outlet. The flow channel communicates with the inlet and the outlet when the valve core is located at the first position. The flow channel is disconnected with the inlet and the outlet when the valve core is located at the second position.

According to the ball valve of this disclosure, the valve core has an axial hole, the axial hole is disposed on a rotational axis of the valve core, the sensor is intercrossed with the flow channel through the axial hole.

According to the ball valve of this disclosure, the valve core is provided with a filter, and the filter is connected with the valve core.

According to the ball valve of this disclosure, the sensor and the rotational assembly are respectively arranged at two opposite sides of the valve core.

This disclosure is directed to a ball valve having an outer valve body, a valve core, and a rotational assembly. The outer valve body has an inlet, an outlet and a first maintenance opening. The valve core is accommodated in the outer valve body, and a flow channel is defined in the valve core. The rotational assembly is connected to the valve core for selectively turning the valve core to a first position or a second position. The inlet, the outlet and the first maintenance opening communicate with the flow channel when the valve core is located at the first position. When the valve core is located at the second position, the first maintenance opening communicates with the flow channel, and the inlet and the outlet are disconnected from the flow channel.

According to this disclosure, the ball valve further has a rotating shaft, and the rotational assembly is connected with the valve core via the rotating shaft.

According to the ball valve of this disclosure, a functional assembly is arranged on the first maintenance opening. The functional assembly has a sensing unit, and the sensing unit is inserted in the flow channel. The functional assembly has a signal transmitter.

According to the ball valve of this disclosure, the valve core is provided with a filter, and the filter is connected to the valve core.

According to the ball valve of this disclosure, the valve core has an axial hole. The axial hole is located at a rotational axis of the valve core and communicates with the flow channel, and the first maintenance opening communicates with the axial hole.

According to the ball valve of this disclosure, the outer valve body further has a second maintenance opening. The flow channel communicates with the second maintenance opening when the valve core is located at the second position.

According to this disclosure, the plurality maintenance openings are arranged on the outer valve body, the valve core has the axial hole, and the axial hole is disposed on the rotational axis of the valve core. When the valve core is turned to the first position, a working fluid (coolant) in the pipeline flows through the functional assembly on the ball valve; when the valve core is turned to the second position the working fluid may not flow through the ball valve, and the functional assembly may be replaced, checked, or cleaned more rapidly at the same time. After the aforementioned operations, the ball valve may return to normal operation only by turning the valve core to the first position.

Therefore, time for maintain the functional assembly may be saved, and it is not necessary to turn off the pipeline in advance.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
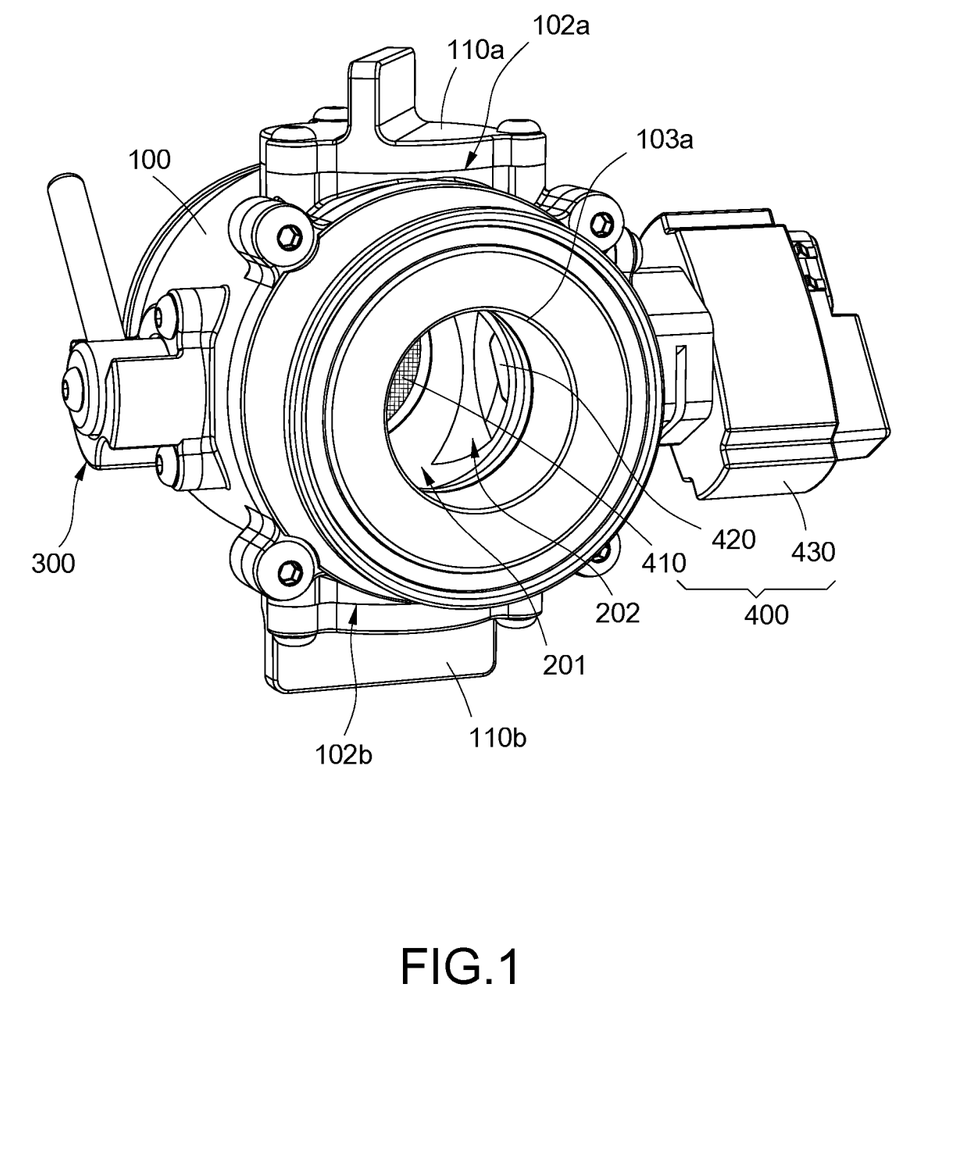
FIG. 1 is one perspective view showing a ball valve according to an embodiment of this disclosure.
Figure 2:
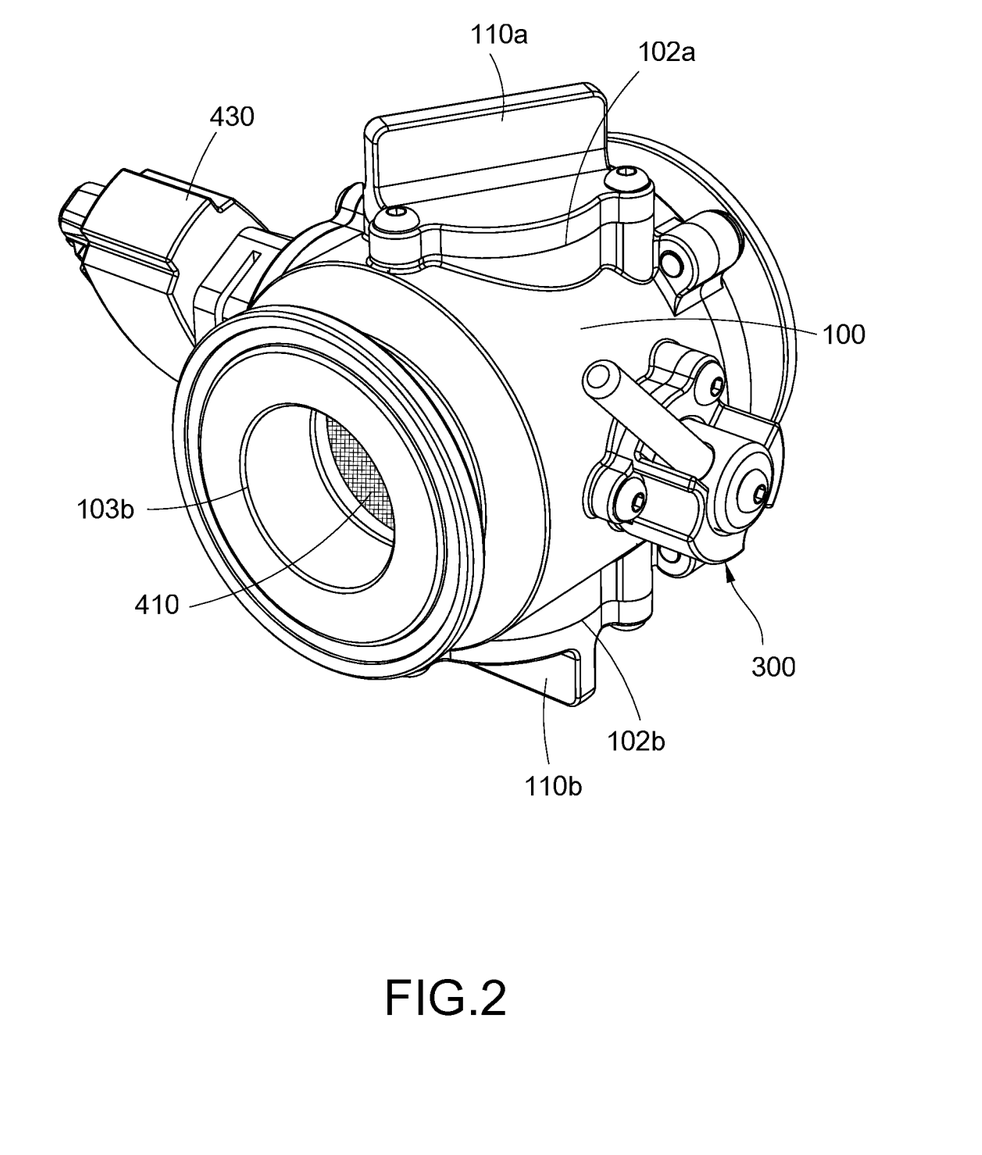
FIG. 2 is another perspective view showing the ball valve according to the aforementioned embodiment of this disclosure.
Figure 3:
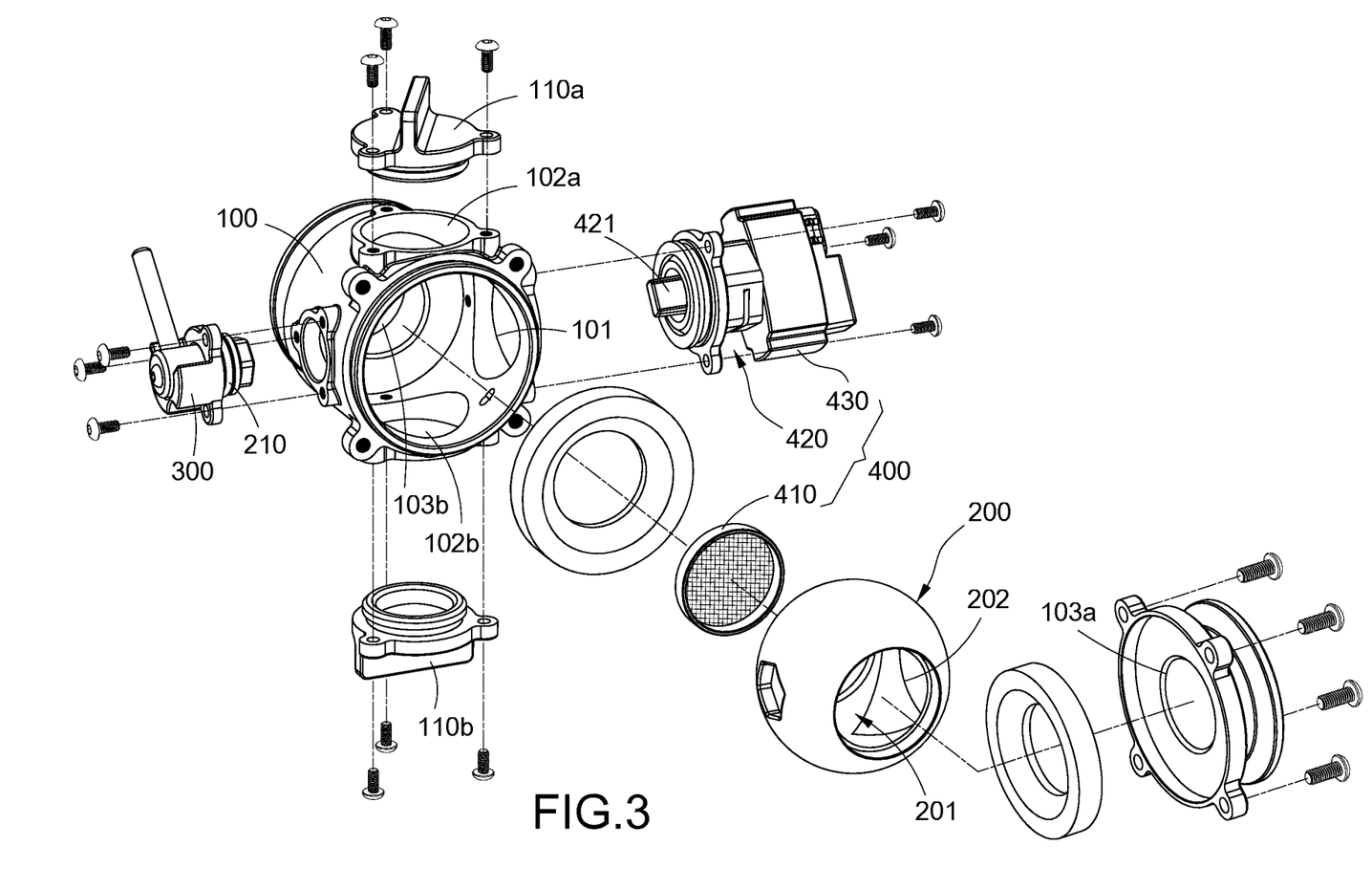
FIG. 3 is an exploded view showing the ball valve according to the aforementioned embodiment of this disclosure.

According to an embodiment of this disclosure shown in FIGS. 1 to 3, a ball valve is provided and the ball valve is arranged on a pipeline. According to this embodiment, the ball valve has an outer valve body 100, a valve core 200, a rotational assembly 300 and a functional assembly 400.

According to this embodiment, the outer valve body 100 has an inlet 103*a*, an outlet 103*b*, a first maintenance opening 101 and a second maintenance opening 102*a*/102*b*. The inlet 103*a* and the outlet 103*b* are respectively disposed at opposite sides of the outer valve body 100, and the second maintenance openings 102*a*/102*b* are respectively disposed at the other opposite sides of the outer valve body 100. Specifically, the inlet 103*a* and the outlet 103*b* are disposed together on one central axis, the two second maintenance openings 102*a*/102*b* are disposed together on another central axis, and the aforementioned two central axes are perpendicularly crossed with each other. The inlet 103*a* and the outlet 103*b* are respectively connected to the pipeline, and the second maintenance openings 102*a*/102*b* may be respectively sealed by sealing covers 110*a*/110*b*.

The valve core 200 is accommodated in the outer valve body 100, the valve core 200 has a rotating shaft 210, the rotating shaft 210 is disposed outside of the valve core 200, and the rotating shaft 210 is connected pivotally to an internal surface of the outer valve body 100 so that the valve core 200 may rotate in the outer valve body 100 with respect to a rotational axis defined by the rotating shaft 210. Specifically, the valve core 200 is spherical, and the aforementioned two central axes are perpendicularly crossed with the rotational axis of the valve core 200. A flow channel 201 is defined in the valve core 200. According to this embodiment, the flow channel 201 straightly penetrates the valve core 200, and the flow channel 201 is perpendicular to the rotational axis of the valve core 200. The valve core 200 has an axial hole 202, the axial hole 202 is disposed on the rotational axis of the valve core 200, the axial hole 202 communicates to a side of the flow channel 201, and the first maintenance opening 101 communicates with the axial hole 202.

Figure 4:
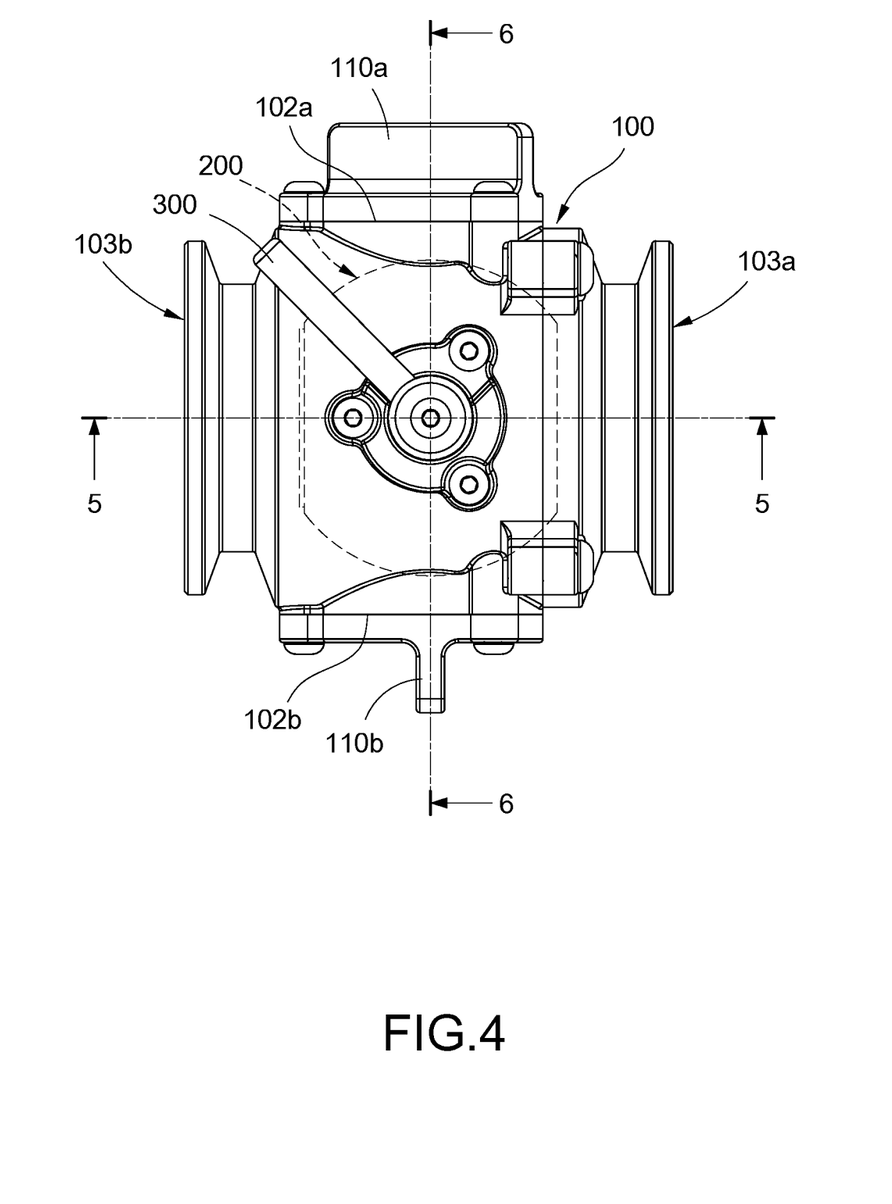
FIG. 4 is a perspective view showing a valve core of the ball valve at a first position according to the aforementioned embodiment of this disclosure.
Figure 5:
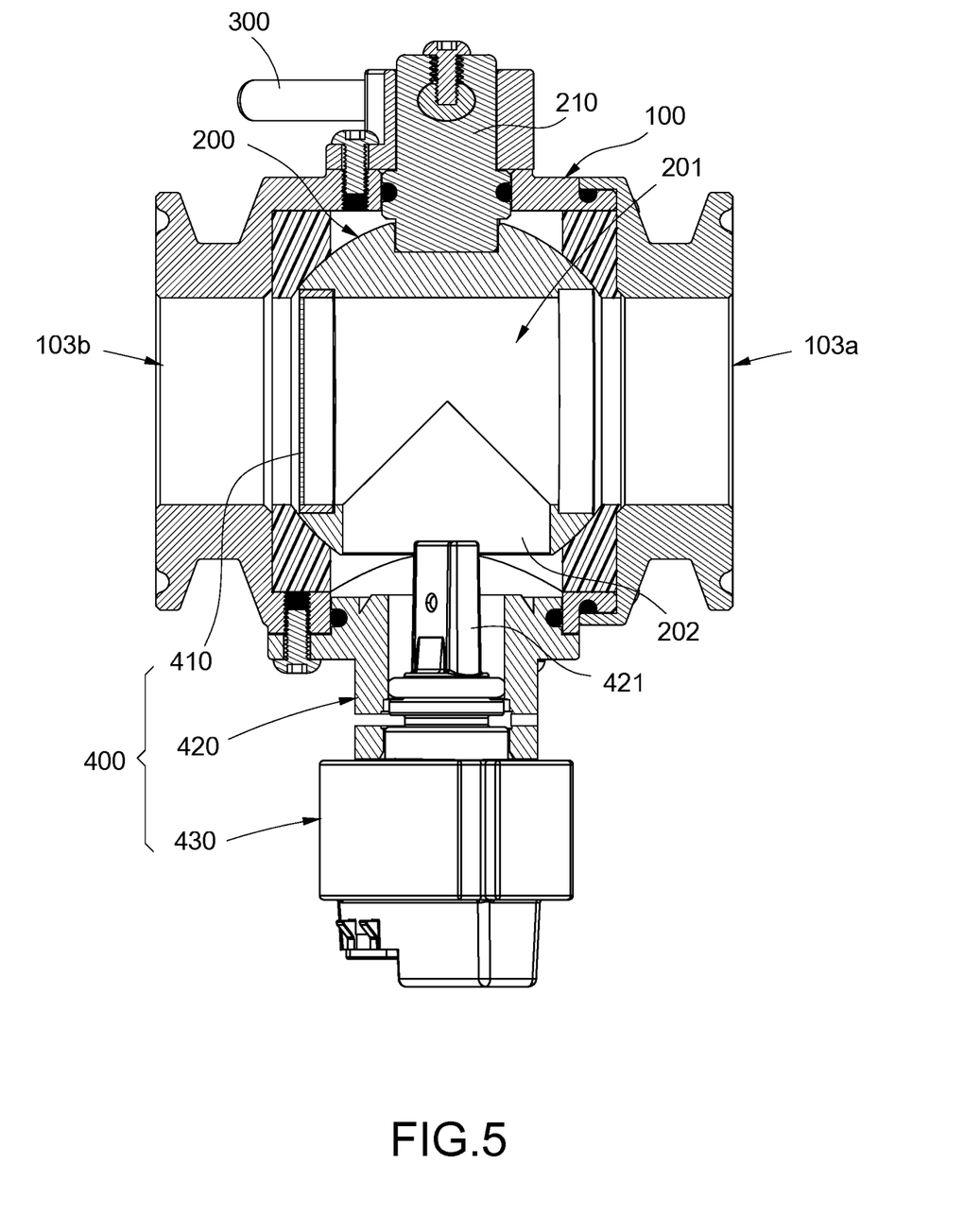
FIG. 5 is a cross-sectional view at cross line 5-5 shown in FIG. 4.
Figure 6:
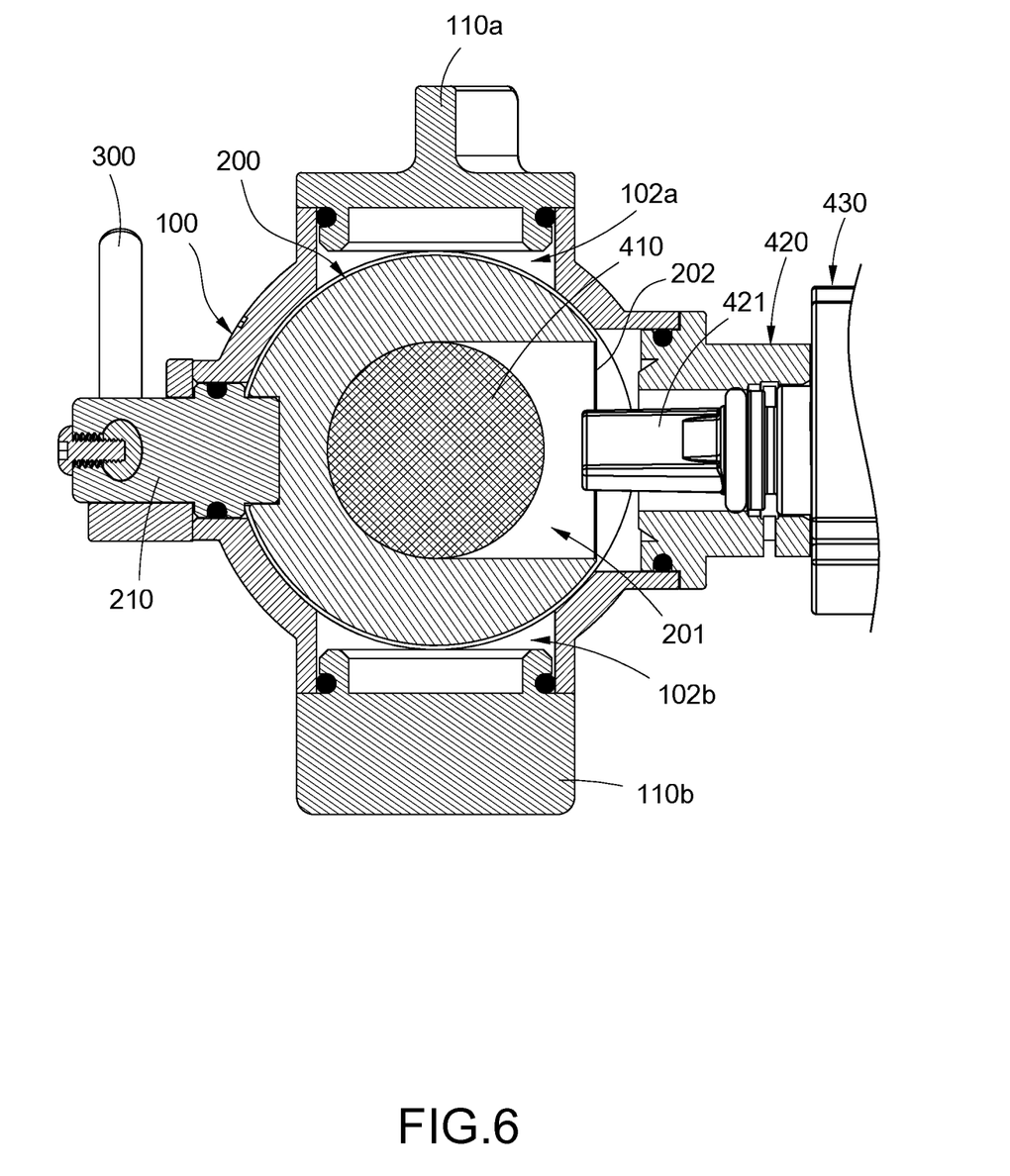
FIG. 6 is a cross-sectional view at cross line 6-6 shown in FIG. 4.
Figure 7:
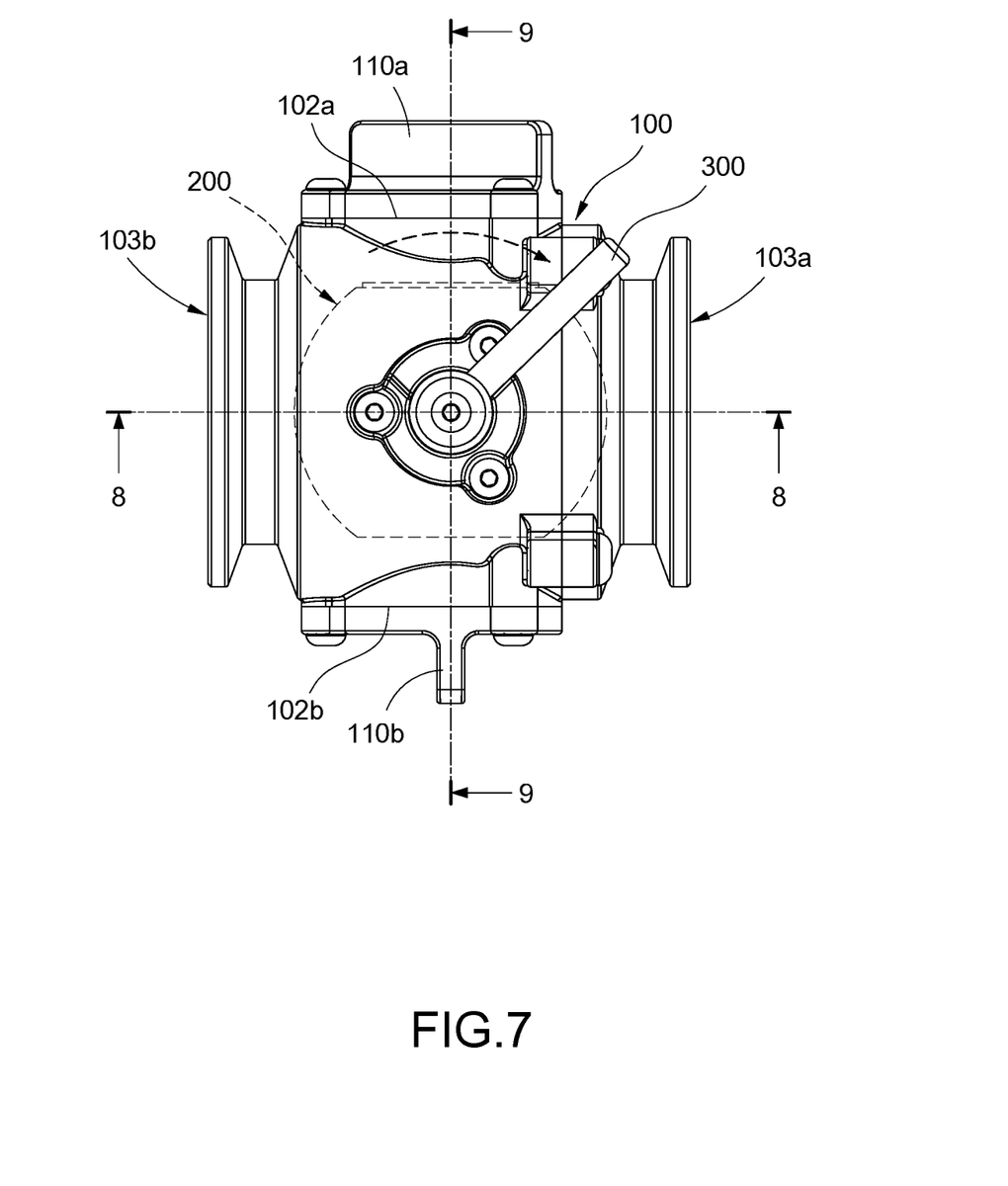
FIG. 7 is a perspective view showing the valve core of the ball valve turned to a second position according to the aforementioned embodiment of this disclosure.
Figure 8:
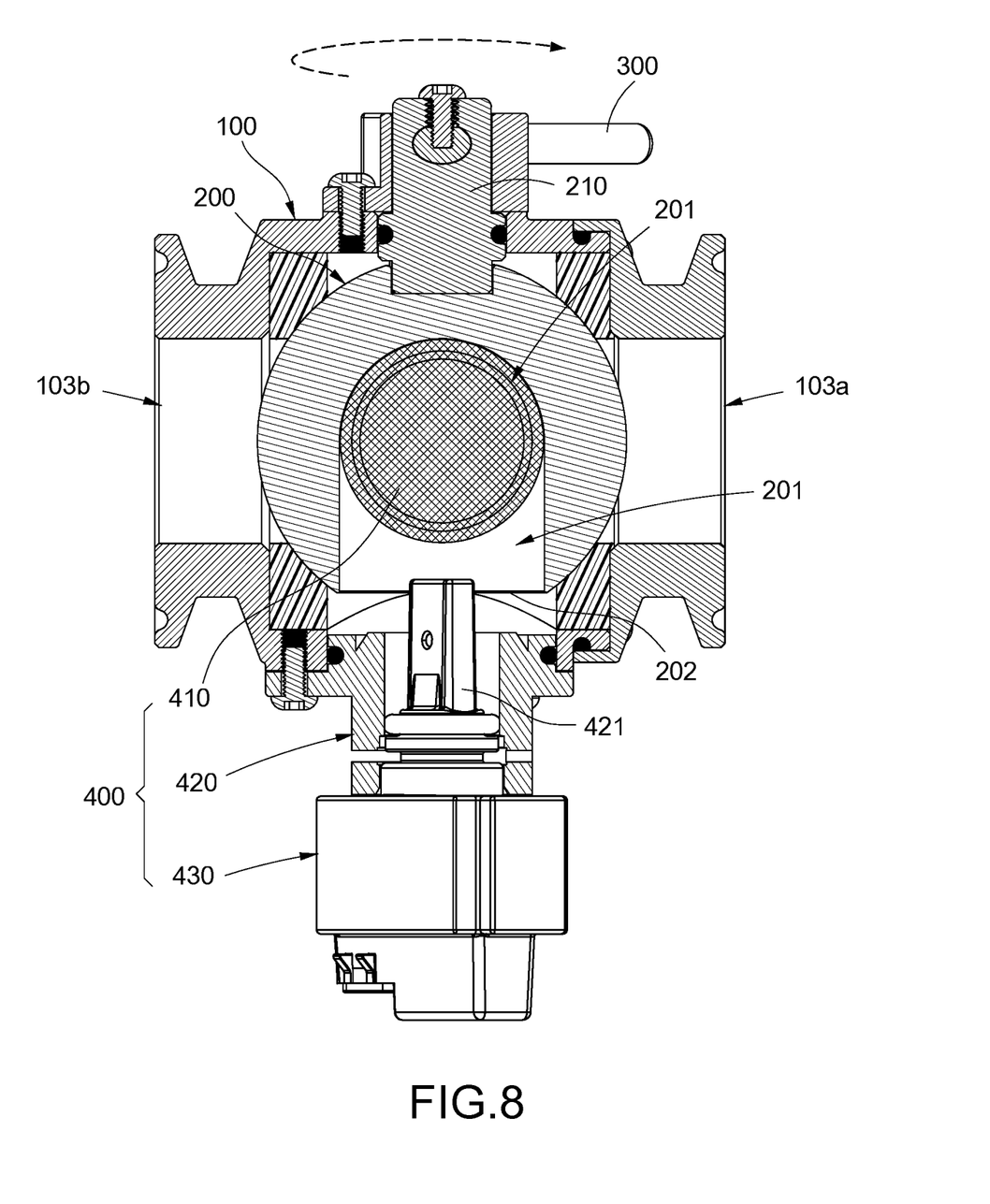
FIG. 8 is a cross-sectional view at cross line 8-8 shown in FIG. 7.
Figure 9:
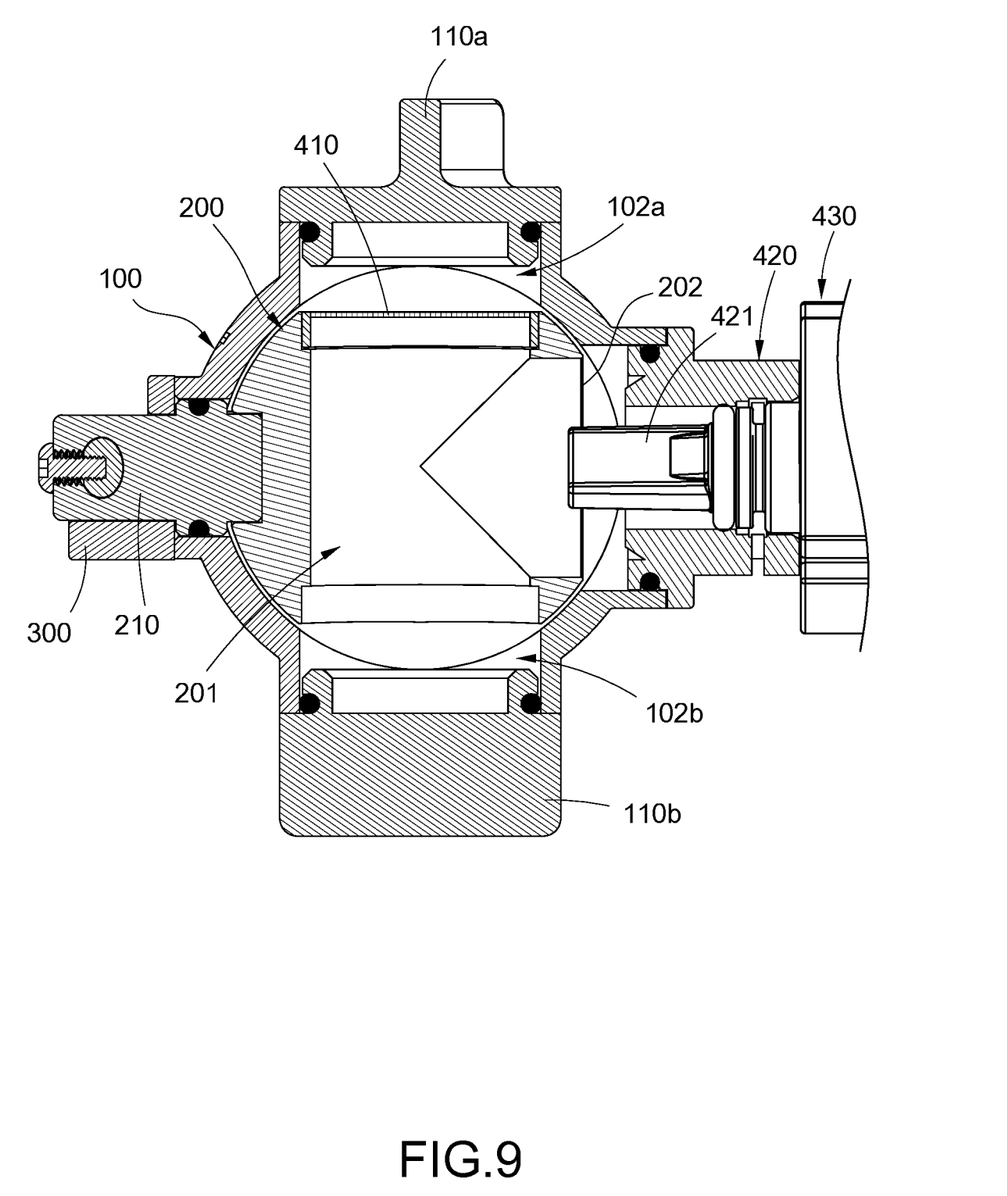
FIG. 9 is a cross-sectional view at cross line 9-9 shown in FIG. 7.

Accordingly, the valve core 200 may be selectively turned to a first position shown in FIG. 4 to 6 or a second position shown in FIGS. 7 to 9. According to FIGS. 5, 6, 8 and 9, when the valve core 200 is turning, the first maintenance opening 101 is kept to communicate the flow channel 201 through the axial hole 202. According to FIG. 5, when the valve core 200 is located at the first position, the inlet 103*a*, the outlet 103*b* and the first maintenance opening 101 communicate with the flow channel 201 to turn on the pipeline. According to FIGS. 8 and 9, when the valve core 200 is located at the second position, the first maintenance opening 101 and the second maintenance opening 102*a* (and/or the second maintenance opening 102*b*) communicate with the flow channel 201, and the inlet 103*a* and the outlet 103*b* are disconnected from the flow channel 201 so as to turn off the pipeline. Therefore, the element at the first maintenance opening 101 is prevented from interfering with the valve core 200 when the valve core 200 is moving, and the element at the first maintenance opening 101 is ensured to keep functioning.

According to FIGS. 1 to 3, the rotational assembly 300 is connected to the valve core 200 for turning the valve core 200. Specifically, the rotational assembly 300 is connected to the rotating shaft 210 of the valve core 200, and a portion of the rotational assembly 300 is disposed outside of the outer valve body 100 for operation. For example, the rotational assembly 300 may have a handle at outside of the outer valve body 100, the rotating shaft 210 penetrates the outer valve body 100 to be connected with the valve core 200 and the handle. An operator may manually operate the rotational assembly 300 or via a machine so as to selectively turn the valve core 200 to a first position or second position. The rotational assembly 300 may have another structure disposed outside of the outer valve body 100 and for an operation by a tool such as wrench and screwdriver. Moreover, associated system may also actuate the rotational assembly 300.

According to FIGS. 3 to 6, a part of the functional assembly 400 may be arranged in the flow channel 201, the functional assembly 400 may selectively has an element such as a filter 410, a sensor 420, a transmitter or a wireless transceiver 430, and the number of the element should not be limited. The functional assembly 400 may be arranged at the valve core 200 or at the first maintenance opening 101.

The functional assembly 400 may has elements with various function. For example, the functional assembly 400 of this embodiment according to FIG. 5 has a filter 410, the filter 410 is disposed in the flow channel 201 and crossed with a longitudinal direction of the flow channel 201. According to FIGS. 8 and 9, the filter 410 is assembled on the valve core 200 to be connected with the valve core 200.

Therefore, when the valve core 200 is turned to separate the flow channel 201 in the valve core 200 from the pipeline, the filter 410 is located in the separated flow channel 201 to facilitate replacing the filter 410.

According to this embodiment, the functional assembly 400 shown in FIGS. 5 and 6 further has a sensor 420, and the sensor 420 of this disclosure should not be limited to this embodiment. For example, the sensor 420 may be a flowmeter or a thermometer. The sensor 420 has a sensing unit 421, the sensor 420 is assembled to the first maintenance opening 101 of the outer valve body 100, and the sensor 420 and the rotational assembly 300 are therefore disposed at two opposite sides of the valve core 200. The sensing unit 421 is inserted in the flow channel 201 through the axial hole 202 of the valve core 200 to detect flow field data (flow rate, pressure, or temperature) in the flow channel 201. According to FIG. 8, when the valve core 200 is turning, the sensing unit 421 is kept in the flow channel 201.

According to this embodiment shown in FIGS. 1 to 3, the functional assembly 400 may further have a transmitter or a wireless transceiver 430 connected with the sensing unit 421 for transmitting data detected by the sensing unit 421.

According to the ball valve of this disclosure, the sensor 420 inserted in the flow channel 201 may be arranged at the first maintenance opening 101. The first maintenance opening 101 is kept to communicate with the flow channel 201 through the axial hole 202 when the valve core 200 is turning, and the flow channel 201 may be turned off for replacing the sensor 420. Moreover, the filter 410 may be replaced through the second maintenance openings 102a/102b when the pipeline is turned off.

The plurality maintenance openings are arranged on the outer valve body 100 according to this disclosure, the valve core 200 has the axial hole 202, the valve core 200 is not penetrated by the axial hole 202 and the axial hole 202 is disposed on the rotational axis of the valve core 200. When the valve core 200 is turned to the first position, a working fluid (coolant) in the pipeline flows through the functional assembly 400 on the ball valve. When the valve core 200 is turned to the second position the working fluid may not flow through the ball valve, and the functional assembly 400 may be replaced, checked, or cleaned more rapidly at the same time. After the aforementioned operations, the ball valve may return to normal operation only by turning the valve core 200 to the first position. Therefore, time for maintain the functional assembly 400 may be saved, and it is not necessary to turn off the pipeline in advance.

Accordingly, this disclosure may be applied to achieve the predetermined purpose so as to solve the problems of the related art. While this disclosure has been described by means of specific embodiments, numerous modifications and variations could be made thereto by those skilled in the art without departing from the scope and spirit of this disclosure set forth in the claims.

What is claimed is:

1. A ball valve, comprising:
    an outer valve body, comprising an inlet, an outlet and a first maintenance opening;
    a valve core, accommodated in the outer valve body, and comprising a flow channel defined therein, wherein the flow channel communicates with the inlet and the outlet when the valve core is located at a first position; and the flow channel is disconnected with the inlet and the outlet when the valve core is located at a second position; two end openings of the flow channel defined on the valve core;
    a rotational assembly, connected to the valve core to turn the valve core;
    a functional assembly, comprising a sensor arranged at the first maintenance opening, intercrossed with the flow channel when the valve core is located either in the first position or in the second position and separated from the valve core; and
    a filter connected with the valve core and entirely disposed in one of the two end openings,
    wherein the flow channel communicates with the first maintenance opening, the inlet, and the outlet, when the valve core is located in the first position; and the flow channel communicates with the first maintenance opening and is disconnected with the inlet and the outlet, when the valve core is located in the second position;
    wherein the outer valve body further comprises a second maintenance opening, and the filter is smaller than the second maintenance opening,
    wherein when the valve core is located in the second position, the flow channel communicates with the second maintenance opening and the filter is aligned to the second maintenance opening so as to allow the filter to be replaced through the second maintenance opening.

2. The ball valve according to claim 1, wherein the functional assembly comprises a signal transmitter.

3. The ball valve according to claim 1, further comprising a rotating shaft, and the rotational assembly connected with the valve core via the rotating shaft.

4. A ball valve, comprising:
    an outer valve body, comprising a first maintenance opening;
    a valve core, accommodated in the outer valve body;
    a rotational assembly, configured to switch the valve core between a first position and a second position;
    a sensor, comprising a sensing unit disposed in a flow channel in the valve core, the sensor arranged at the first maintenance opening and separated from the valve core; and
    a filter connected with the valve core,
    wherein two end openings of the flow channel are defined on the valve core and the filter is entirely disposed in one of the two end openings;
    wherein the flow channel communicates with the first maintenance opening when the valve core is located in the first position and the second position;
    wherein the outer valve body further comprises a second maintenance opening, and the filter is smaller than the second maintenance opening,
    wherein, when the valve core is located in the second position, the flow channel communicates with the second maintenance opening and the filter is aligned to the second maintenance opening so as to allow the filter to be replaced through the second maintenance opening.

5. The ball valve according to claim 4, wherein the sensing unit is in the flow channel when the valve core is located either in the first position or in the second position.

6. The ball valve according to claim 4, wherein the outer valve body comprises an inlet and an outlet, wherein the flow channel communicates with the inlet and the outlet, when the valve core is located in the first position; and the flow channel is disconnected with the inlet and the outlet, when the valve core is located in the second position.

7. The ball valve according to claim 4, wherein the valve core comprises an axial hole disposed on a rotational axis of the valve core, and the sensor is intercrossed with the flow channel through the axial hole.

8. The ball valve according to claim 4, wherein the sensor and the rotational assembly are respectively arranged at two opposite sides of the valve core.

9. A ball valve comprising:
an outer valve body, comprising an inlet, an outlet and a first maintenance opening;
a valve core, accommodated in the outer valve body, and comprising a flow channel defined therein, two end openings of the flow channel defined on the valve core;
a rotational assembly, connected to the valve core to selectively turn the valve core to a first position or a second position; and
a filter, entirely disposed in one of the two end openings,
wherein when the valve core is located in the first position, the inlet, the outlet and the first maintenance opening communicate with the flow channel;
when the valve core is located in the second position, the first maintenance opening communicates with the flow channel, and the inlet and the outlet are disconnected from the flow channel;
wherein the outer valve body further comprises a second maintenance opening, the filter is smaller than the second maintenance opening;
wherein, when the valve core is located in the second position, the flow channel communicates with the second maintenance opening and the filter is aligned to the second maintenance opening so as to allow the filter to be replaced through the second maintenance opening;
wherein a functional assembly is arranged on the first maintenance opening and separated from the valve core.

10. The ball valve according to claim 9, further comprising a rotating shaft, and the rotational assembly connected with the valve core via the rotating shaft.

11. The ball valve according to claim 9, wherein the functional assembly comprises a sensing unit inserted in the flow channel.

12. The ball valve according to claim 9, wherein the functional assembly comprises a signal transmitter.

13. The ball valve according to claim 9, wherein the valve core comprises an axial hole located at a rotational axis of the valve core and communicating with the flow channel, and the first maintenance opening communicates with the axial hole.

* * * * *